United States Patent [19]

Overy

[11] Patent Number: 4,966,692
[45] Date of Patent: Oct. 30, 1990

[54] FILTRATION SYSTEM HAVING FLOW CONTROL MEANS AND TANK ADAPTER WITH SELECTIVE VENTING

[75] Inventor: Douglas E. Overy, Auburn, Ind.

[73] Assignee: Flint & Walling, Inc., Kendallville, Ind.

[21] Appl. No.: 348,345

[22] Filed: May 5, 1989

[51] Int. Cl.⁵ .............................................. B01B 24/18
[52] U.S. Cl. .................................. 210/123; 210/205; 210/278; 210/279; 210/541; 210/436
[58] Field of Search ................ 137/588; 210/274, 205, 210/277, 278, 123, 232, 239, 240, 541, 542, 436, 279

[56] References Cited

U.S. PATENT DOCUMENTS

| | | | |
|---|---|---|---|
| 2,087,887 | 7/1937 | Gesner | 210/278 |
| 2,237,882 | 4/1941 | Lawlor et al. | 210/722 |
| 2,543,813 | 3/1951 | Stover | 210/202 |
| 2,570,258 | 10/1951 | McGill et al. | 210/278 |
| 3,167,506 | 1/1965 | Fackler et al. | 210/722 |
| 3,193,989 | 7/1965 | Sebeste | 210/188 |
| 3,335,752 | 8/1967 | Hiers et al. | 210/278 |
| 3,421,625 | 1/1969 | Fritz | 210/120 |
| 3,495,622 | 2/1970 | Rose | 137/588 |
| 3,649,532 | 3/1972 | McLean | 210/718 |
| 3,707,233 | 12/1972 | Lerner | 210/278 |
| 4,068,681 | 1/1978 | McNair et al. | 137/588 |
| 4,129,502 | 12/1978 | Garrett | 210/750 |
| 4,136,032 | 1/1979 | Bakken et al. | 210/278 |
| 4,210,532 | 7/1980 | Loke | 210/278 |
| 4,235,718 | 11/1980 | Lopez | 210/278 |
| 4,301,009 | 11/1981 | Cook et al. | 210/278 |
| 4,317,731 | 3/1982 | Roberts, Jr. et al. | 210/741 |
| 4,430,228 | 2/1984 | Paterson | 210/688 |
| 4,659,463 | 4/1987 | Chandler et al. | 210/202 |

*Primary Examiner*—Peter Hruskoci
*Assistant Examiner*—Cynthia L. Nessler
*Attorney, Agent, or Firm*—Edgar A. Zarins; Malcolm L. Sutherland

[57] ABSTRACT

A system for removing contaminants from water prior to supply to service by entraining a controlled quantity of air into the water to oxidize the contaminant particles and then filtering the contaminants in a combination aeration/filtration tank. The filtration tank includes an adapter which cooperates with a filter tank and the control valve for the filter tank to facilitate precipitation of water through the filter bed and venting of excess gases from the tank in addition to the filtering and backwash functions of the filter tank. The adapter is designed to cooperated with the control mechanism and tank of filter tanks used in currently available water conditioning systems.

22 Claims, 3 Drawing Sheets

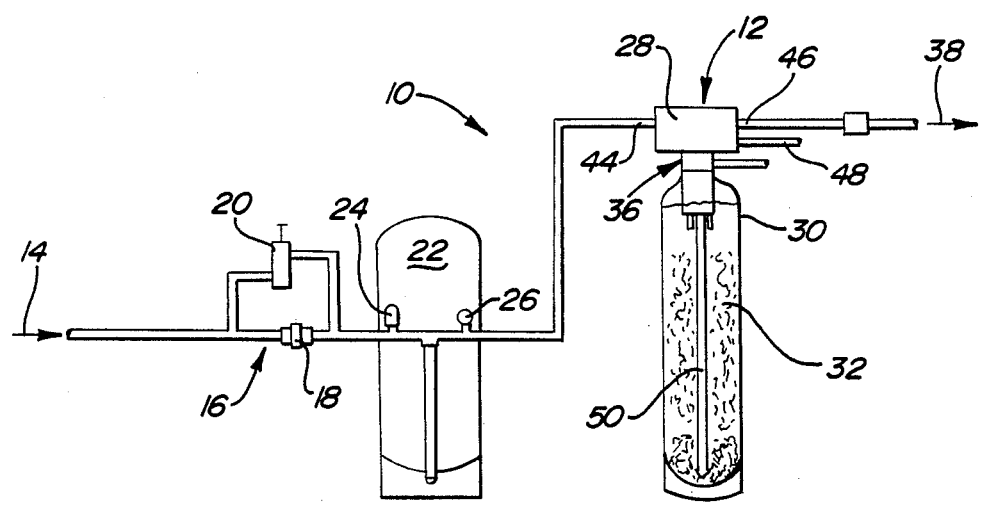
_Fig-1_
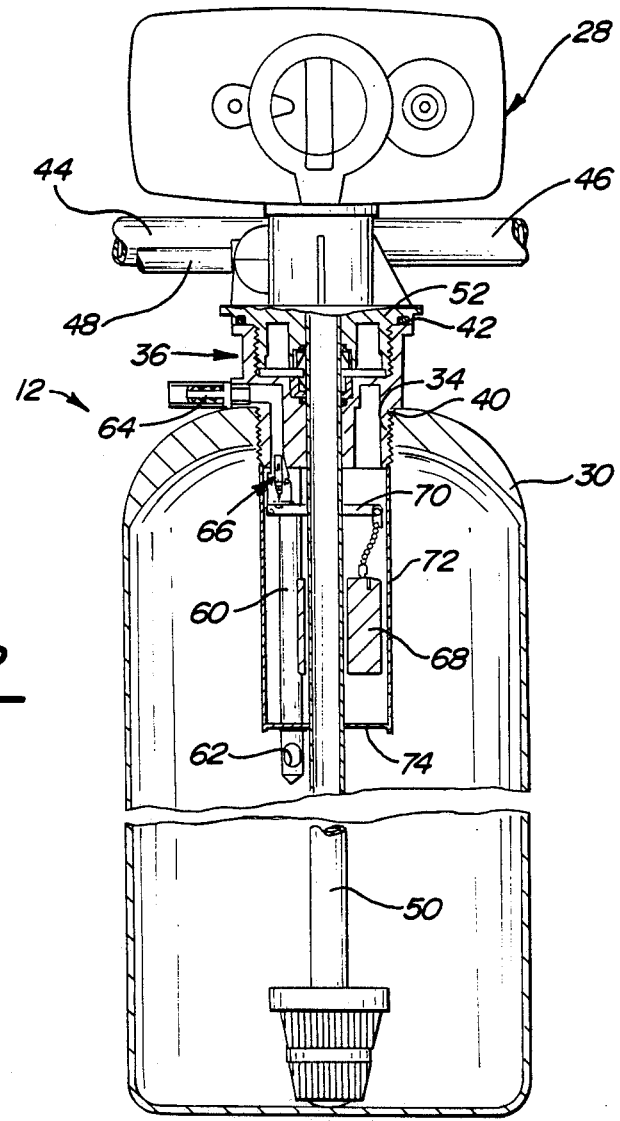
_Fig-2_

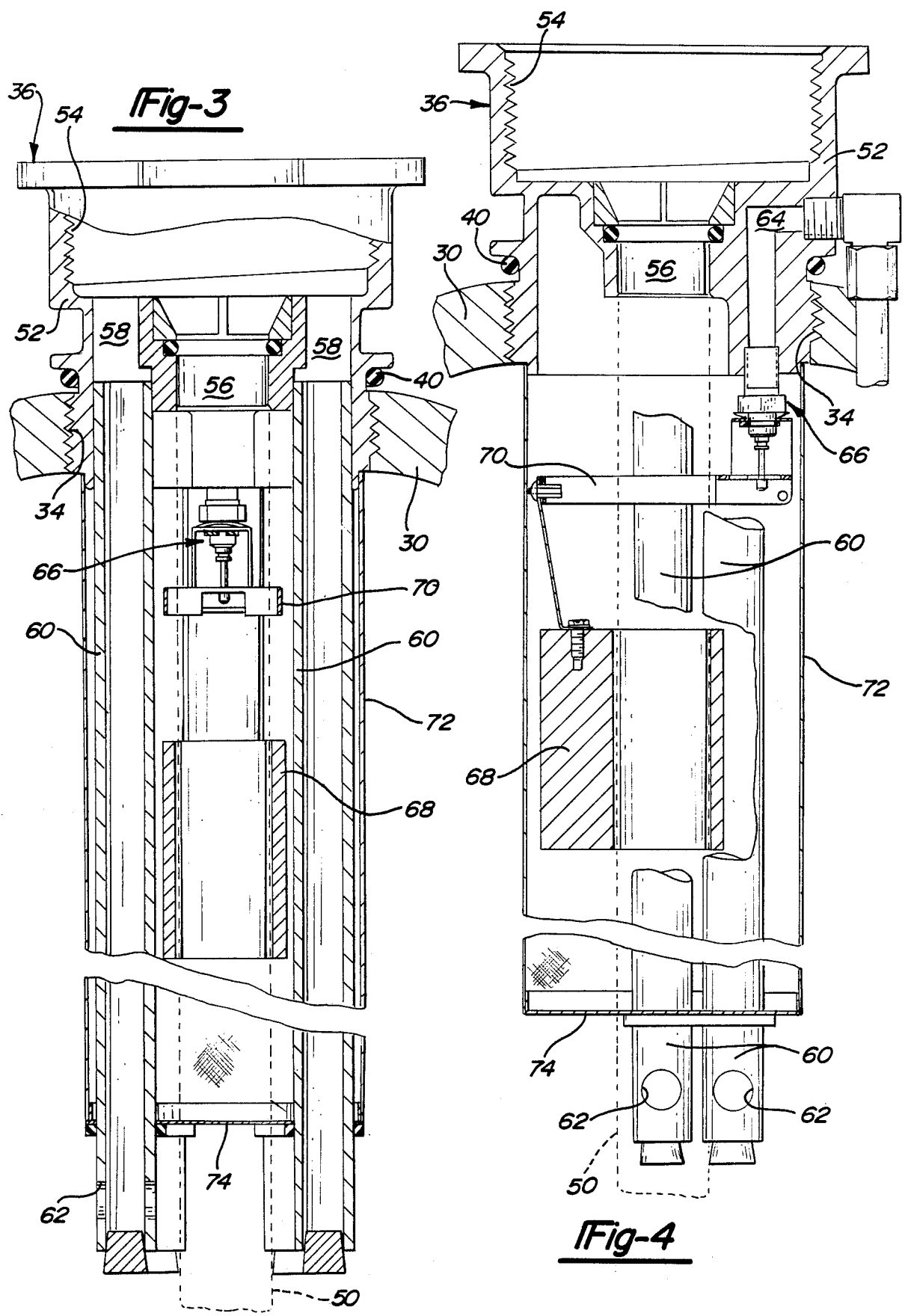

U.S. Patent   Oct. 30, 1990   Sheet 3 of 3   4,966,692
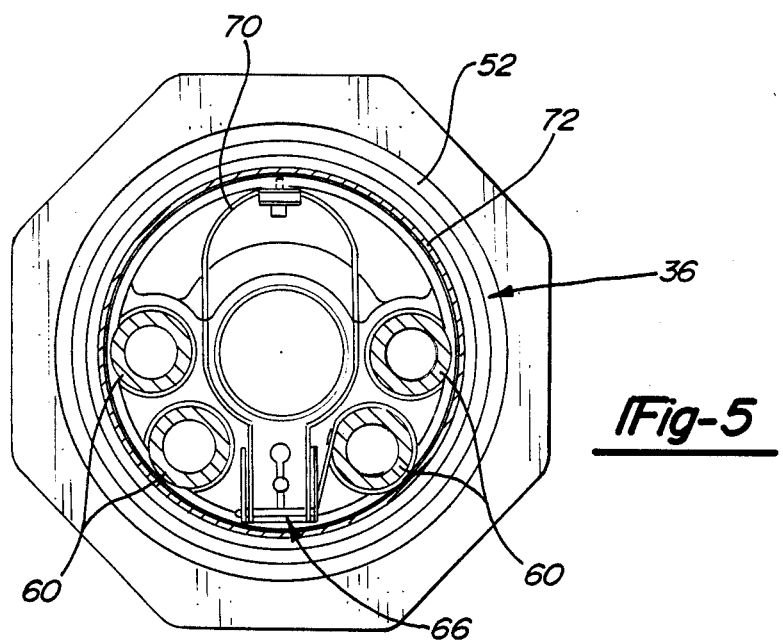
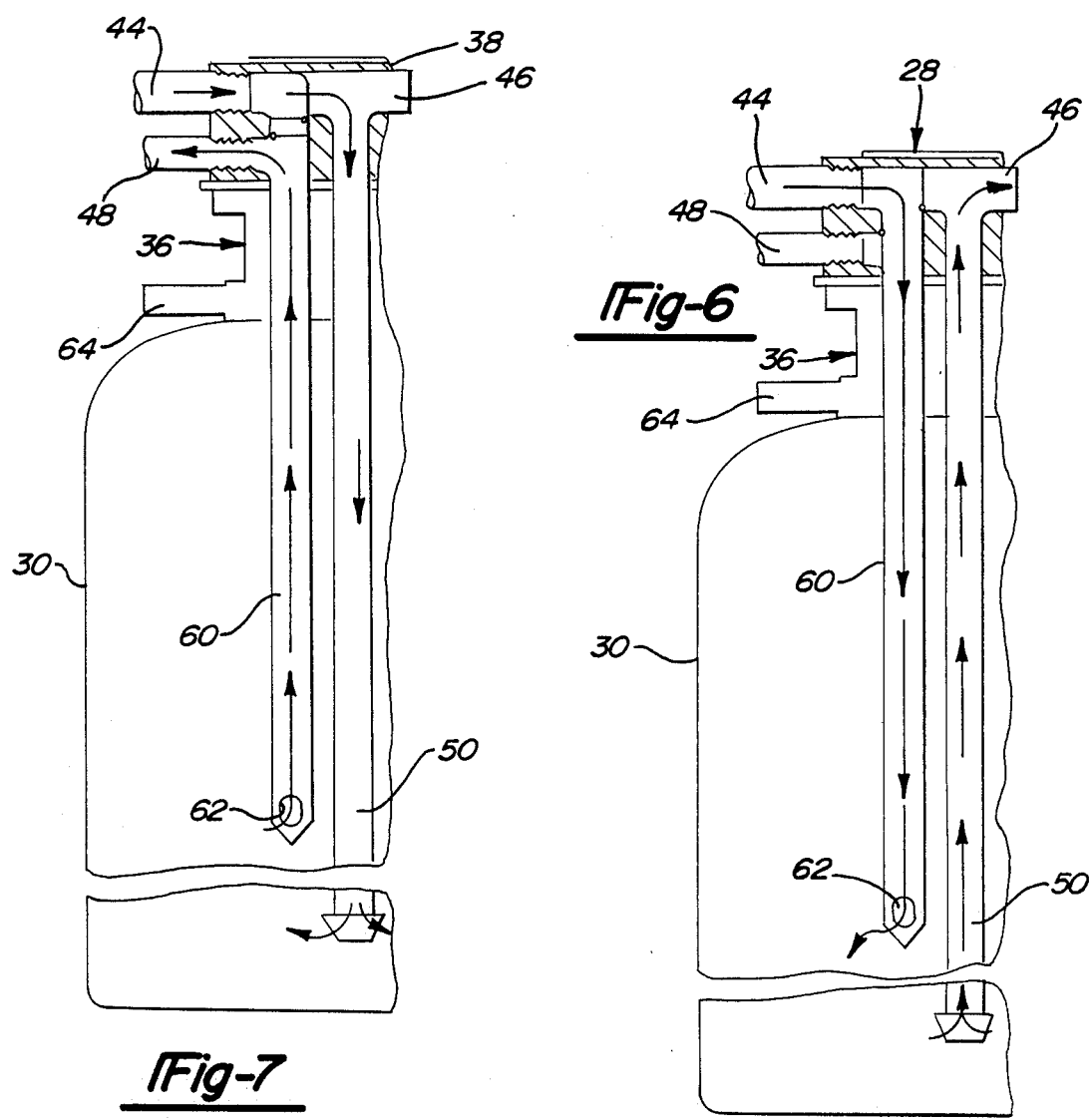

FILTRATION SYSTEM HAVING FLOW CONTROL MEANS AND TANK ADAPTER WITH SELECTIVE VENTING

Background Of The Invention

I. Field of the Invention

This invention relates to a system for removing contaminants from a water supply prior to service to the user and, in particular, to a tank adapter which permits a single tank to be used for both aeration and filtration.

II. Description of the Prior Art

Systems for removing impurities such as iron, sulphur and man-made contaminants from a water supply have been developed and refined over the years in order to provide a safe and palatable water supply. Generally, these systems include chlorination and filtration of the water to remove the contaminants. However, many contaminants must first be oxidized to permit removal through filtration. Accordingly, several of the past known systems employ means for entraining air into the water stream to facilitate removal of the contaminants. Examples of means for entraining air into the water supply range from simple venturi nozzles which entrain an uncontrollable amount of air to venturis combined with bypass valves to control and adjust the amount of air which is entrained to allow for efficient precipitation of contaminants.

In the past known contaminant removal systems, the air entrained water flows to an aeration tank where the water is precipitated to allow excess air to be removed from the system. The air which builds up within the aeration tank must be regularly bled from the tank for proper operation. Thereafter, the water flows to a filter tank which contains a filter bed to filter the contaminants from the water prior to being passed to service. Because the filter bed occasionally becomes clogged with the contaminants a backwash cycle is necessary to remove the contaminants from the filter material. During normal operation, the air-entrained water is precipitated over the filter bed and passes through the bed prior to being delivered to service. However, a build-up of air within the filter tank is not uncommon which can result in a blowout of the filter bed during the backwash cycle. Moreover, the multiple tank system is both costly to manufacture and to install as well as requiring excessive space for operation.

SUMMARY OF THE PRESENT INVENTION

The present invention overcomes the disadvantages of the prior known water systems by providing a combined aeration and filtration tank to remove contaminants from the water supply and vent any excess air. The combination tank is made possible by a tank adapter which cooperates with the control valve of past known filter tanks and is adapted to be received within the filter tanks to allow for the combined operation of venting and filtration.

The water system of the present invention includes means for entraining a controlled quantity of air into the water supply to oxidize the contaminants prior to filtration. In the preferred embodiment, the entraining means includes a venturi nozzle in parallel arrangement with a selectively adjustable bypass valve although any air entrainment means may be utilized. Within the fluid system is a pressure tank designed to store water under pressure for subsequent use thereby preventing the pump from being run continuously. The air entrained water flows to a filter tank which precipitates the water over a filter bed as excess air is removed. Since the preferred embodiment of the system utilizes means for controlling the amount of air entrained into the water, the excess air should be minimized. Nevertheless, the filter tank incorporates means for venting the excess air/gases from the tank in the event it builds up to an unsuitable level. The water flows through the filter bed to remove contaminants and is introduced to service. As the filter bed is clogged by the contaminants, a backwash cycle is initiated to remove the contaminants from the system.

The combined aeration/filtration tank utilizes an adapter to allow precipitation of the water across the filter bed, selective venting of excess air at a predetermined level, and a backwash of the filter bed to remove the filtered contaminants. The adapter is designed to be used with the filter tanks of past known systems and its valves. The adapter is received within the upper end of the tank and mates with the control valve of the filter tank. The adapter includes a float attached to an air valve for venting of the gases when the water reaches a predetermined level. A screen surrounding the float and valve prevents the filter medium from fouling the venting mechanism. Supply tubes direct the water from the control valve through the screen enclosure for precipitation through the filter bed. These tubes also facilitate backwash of the filter bed by reversing the flow which is controlled by the valve mounted to the adapter. Thus, the adapter allows the elimination of the aeration tank from the water system by combining the functions thereof into the filter tank.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a diagrammatic perspective of the system for removing contaminants from water embodying the present invention;

FIG. 2 is a partial cross-sectional perspective of the filtration tank utilized in the system of the present invention;

FIG. 3 is a first cross-sectional perspective of the adapter used in the filtration tank;

FIG. 4 is a second cross-sectional perspective of the adapter used in the filtration tank;

FIG. 5 is an end cross-sectional perspective of the adapter taken along lines 5—5 of FIG. 4;

FIG. 6 is a diagrammatic perspective of the fluid flow through the adapter and filter tank during normal operation; and FIG. 7 is a diagrammatic perspective of the fluid flow through the adapter and filter tank during a backwash cycle.

DETAILED DESCRIPTION OF A PREFERRED EMBODIMENT OF THE PRESENT INVENTION

Referring first to FIG. 1, there is shown a water treatment system 10 for removing contaminants from water supplied under pressure. The system 10 requires less space and is more economical to manufacture and assemble as a result of a combined filtration/aeration tank 12 which combines the operations of prior known systems. The system 10 of the present invention removes the contaminants by entraining a sufficient amount of air to oxidize the contaminants and thereafter filtering the contaminants from the water. In addition, excess gases, including gases which may give the water a foul taste, are vented from the water and system. As a result, filtered and aerated water is provided to service.

The system 10 of the present invention is normally utilized with a well wherein raw well water is delivered to the system 10 at inlet 14. The water flows through means 16 for entraining a controlled quantity of air into the water in accordance to the flow rate of water through the means 16. In a preferred embodiment, the air entrainment means 16 includes a nozzle/venturi 18 in a parallel flow arrangement with an adjustable bypass valve 20. The nozzle/venturi 18 and bypass valve 20 preferably ensure entrainment of a controlled quantity of air according to the volume of water flowing through the system 10. By controlling the amount of air entrained into the water oxidation of the contaminants can be controlled while a surplus of air within the system 10 can be minimized.

After passing through the air entrainment assembly 16 the air laden water enters or bypasses a pressure tank 22. When water is being demanded for service, the water bypasses the pressure tank 22. However, if water is not being demanded for service, the air laden water flows into the pressure tank 22 for storage under pressure and subsequent delivery to service. As a result, the pump which delivers the water would not have to be run continuously. The pressure tank 22 may be provided with a pressure switch 24 and gauge 26 to control and monitor the water pressure within the tank 22.

Referring now to FIGS. 1 & 2, the water bypassing or flowing from the pressure tank 22 flows into the filtration/aeration tank 12 of the system 10. Fluid flow through the tank 12 is controlled by a valving mechanism 28 mounted on top of the tank 12. The valving mechanism 28 controls fluid flow during the normal operating cycle and the backwash cycle as will be subsequently described. The tank 12 includes a tank body 30 which contains a filter media 32 to filter the contaminants from the water as it flows through the tank 12. The tank body 30 includes a neck opening 34 adapted to receive the flow control mechanism 28. In the prior known systems, the control mechanism 28 is mounted directly within the opening 34 of the tank 30. However, in a preferred embodiment of the present invention, an adapter 36 is positioned between the flow control 28 and the tank 30 to convert the filtration tank into the aeration/filtration tank 12 of the present invention. The adapter 36 is designed to be received within the opening 34 without modification and receives the flow control mechanism 28 such that the components of the prior known systems can be utilized in the improved system 10 of the present invention.

Once the water has passed through the filtration/aeration tank 12 to remove the contaminants, the filtered water is delivered to service at 38 for use by the customer. The water is substantially devoid of contaminants and foul gases making it suitable for drinking and washing.

Referring now to FIGS. 2 through 5, the advantage of the present invention are realized as a result of the combined filtration/aeration tank 12. The adapter 36 converts a simple filtration tank to the filtration/aeration tank 12 of the present invention while simultaneously allowing the components of the filtration tank, namely the tank body 30 and the flow control mechanism 28, to be used with the improved system without the need for modifications. The adapter 36 is threadably received within the top opening 34 of the tank 30. The adapter 36 is provided with O-ring seal 40 to seal the adapter 36 against the tank body 30. Similarly, the adapter 36 threadably receives the flow control mechanism 28 which includes seal 42 to prevent fluid leakage. The flow control 28 includes a main fluid inlet 44 for delivery of the air laden water to the tank 12, a main fluid outlet 46 for delivery of the filtered water to service, and a secondary fluid outlet 48 for backwash of the filter media 32 within the tank. The mechanism 28 controls fluid flow such that during the normal operating cycle, water will flow through main fluid inlet 44 into the tank 30 and out of the tank 30 through main fluid outlet 46 after passing through the filter media 32 and flowing up riser tube 50 connected to the control mechanism 28. During the backwash operating cycle, water will flow through main fluid inlet 44 down riser tube 50 into the filter media 32 to force the filtered contaminants out through the secondary drain tube 48. The adapter 36 of the present invention does not change these operations although the fluid must flow through the adapter 36. Thus, the adapter 36 of the present invention provides simple adaptation and conversion of the filtration tank to a combined filtration/aeration tank 12.

Referring now to FIGS. 3 through 5, the adapter includes a flange body 52 which is threadably received within the opening 34 of the tank 30. The flange body 52 includes an upper opening 54 to matingly, threadably receive the flow control mechanism 28. The flange body 52 includes a central passageway 56 through which the riser tube 50 extends to engage the control valve 28. Additionally, the flange 52 is provided with a series of outer parallel passageways 58 which communicate with corresponding flow tubes 60. During the normal operating cycle, the flow tubes 60 communicate with the main fluid inlet 44 of the control mechanism 28 so that water can be delivered through openings 62 formed at the bottom of the flow tubes 60 into the tank 12. In a preferred embodiment, a plurality of flow tubes 60 are included in order to provided the necessary flow capacity. Thus, the passageways 58 and flow tubes 60, as well as the riser tube 50 extending through the central passage 56 of the adapter flange 52, facilitate fluid communication between the flow control mechanism 28 and the interior of the tank 30.

The adapter 36 further includes means for selectively venting accumulated gases from the tank 12 in the form of a vent passageway 64 and a vent valve 66 disposed within the vent passageway 64. The vent passageway 64 is formed in the flange body 52 to provide selective communication between the interior and exterior of the tank 12. The vent valve 66 positioned within the passageway 64 controls venting of the accumulated gases by opening only when the water level within the tank 12 drops below a predetermined level as a result of an excess accumulation of gases within the tank 12. The valve 66 is operably connected to a float member 68 by a pivot arm 70. Accordingly, as the float 68 travels downwardly with the water level, the arm 70 will pivot until the valve 66 is opening to vent the accumulated gases through the passageway 64. As the gases are vented from the tank 12 the water level will rise causing the float 68 to rise and close the vent valve 66. In a preferred embodiment, the float 68 is slidably mounted to the riser tube 50 to reduce space requirements.

In order to prevent the filter media 32 from engaging and damaging the venting assembly, the adapter 36 is provided with a screen housing 72 attached to the flange body 52. In a preferred embodiment, the screen housing 72 has a tubular construction with an end plate 74 through which the flow tubes 60 and riser tube 50 extend. The ports 62 of the flow tubes 60 and the bottom end of the riser tube 50 are disposed outside of the screen housing 72 to allow the uninhibited flow of fluid. However, the float member 68, the vent valve 66 and the vent passageway 64 are disposed within the screen housing 72 to prevent the filter media 32 and any contaminants from coming in contact. Nevertheless, gases and water will flow freely through the screen 72 to effect the float and for venting from the tank 12. Thus, the adapter 36 of the present invention facilitates venting of excess gases while also allowing the free flow of water during both the normal cycle and the backwash cycle as will be subsequently described. Furthermore, the adapter 36 fits within the opening 34 of the standard filtration tank 30 and receives the standard control mechanism 28 without modification to either component allowing for simple adaptation of existing systems to the compact system of the present invention.

Operation of the system 10, particularly the filtration-/aeration tank 12, allows for removal of contaminants from the water as well as excess gases which may give the water a foul smell or taste. With the control mechanism 28 of the filtration tank 12 set for normal operation air laden water will flow through main inlet 44 through the flow tubes 60 into the tank housing 30. As the water enters the upper portion of the tank housing 30 excess air and gases will separate from the water. As the water flows through the filter media 32, contaminants will be filtered therefrom. The filtered water flows into and up riser tube 50 through the adapter 36 into the flow control mechanism 28 where it is diverted to the main outlet 46 for delivery to service. The flow of water during the normal operating cycle is shown diagrammatically in FIG. 6. In the event the gases within the tank 30 reach a predetermined volume thereby lowering the level of the water, the vent valve 66 will be opened to expel the excess gases through vent passageway 64.

When the filter media 32 within the tank 12 become clogged with contaminants such that the flow of water is inhibited, it is necessary to flush these contaminants from the filter bed 32 by backwashing the bed 32. The flow control mechanism 28 is switched to a backwash cycle to divert water from the main inlet 44 down through the riser tube 50 into the filter bed 32 causing the water to flow up through the filter media 32 loosening and removing the contaminant particles therefrom. However, the backwash flow will continue up through the flow tubes 60 through the adapter 36 into the flow control mechanism 28 where the dirty water is diverted to the secondary outlet 48 for disposal. The flow of water during the backwash cycle is shown diagrammatically in FIG. 7. Thus, the adapter 36 does not affect the operation of the normal operating and backwash cycles except to vent any excess air which may build up within the filtration tank 12.

The foregoing detailed description has been given for clearness of understanding only and no unnecessary limitations should be understood therefrom as some modification will be obvious to those skilled in the art without departing from the scope and spirit of the appended claims.

I claim:

1. A system for removing contaminants from a water supply comprising:
    means for entraining a controlled quantity of air into the water to oxidize the contaminants in the water;
    a filtration tank having a filter bed for filtering contaminants from the water and flow control means to control fluid flow through said tank, said control means including a fluid inlet to receive the water from said air entraining means, a fluid outlet to deliver filtered water to service, and means for backwashing said filter bed to dispose of accumulated contaminants; and
    an adapter received within a neck opening of said tank and receiving said flow control means said adapter having means for selectively venting accumulated gases from said filtration tank, the water flowing through said flow control means into said tank, through said filter bed to remove contaminants from the water, and from said filtration tank through said fluid outlet of said flow control means.

2. The system as defined in claim 1 and further comprising a pressure tank for storing air entrained water prior to delivery to said filtration tank, said pressure tank positioned between said means for entraining air into the water and said filtration tank.

3. The system as defined in claim 2 wherein said adapter includes at least one fluid passageway in fluid communication with said flow control means of said filtration tank and means for receiving a stand pipe of said flow control means extending into said filter bed of said filtration tank, fluid flowing through said at least one fluid passageway and said stand pipe in a first direction during normal operation of the system and flowing through said at least one fluid passageway and said stand pipe in a second direction during backwash of the system, said flow control means controlling fluid flow through said at least one fluid passageway and stand pipe.

4. The system as defined in claim 3 wherein said venting means includes a vent port formed in said adapter and valve means for selectively opening said vent port when the accumulated gases attain a predetermined volume within said tank.

5. The system as defined in claim 4 wherein said venting valve means comprises a valve actually connected to a float member, said float member opening and closing said valve in accordance with the water level within said tank to vent accumulated gases from said filtration tank.

6. The system as defined in claim 5 wherein said adapter includes a screen housing enclosing said venting valve means to prevent filtration media of said filter bed from engaging said valve means.

7. The system as defined in claim 6 wherein said at least one fluid passageway includes a plurality of flow tubes extending through said screen housing to provide fluid communication between said flow control means and the interior of said filtration tank.

8. A filtration tank assembly for use in a system for removing contaminants from a water supply, the filtration tank assembly receiving air laden water and returning filtered water to service, said filtration tank assembly comprising:

a tank housing having a filter media therein for filtering contaminants from the water and a neck opening;

flow control valving means adapted to be received within said neck opening of said tank housing, said valving means controlling fluid flow through said tank for normal operation and backwash operation, said valving means having a fluid inlet to receive the air laden water during normal operation and a fluid outlet to deliver filtered water to service during normal operation; and an adapter mounted within said neck opening of said tank housing and receiving said flow control valving means, air laden water from said valving means flowing through at least one fluid passageway of said adapter during normal operation into said tank housing, said adapter including means for selectively venting accumulated gases from said tank housing.

9. The tank assembly as defined in claim 8 wherein said valving means includes a stand pipe extending through said adapter into said tank housing, water flowing from said tank housing through said stand pipe and valving means to service during normal operation and flowing from said valving means through said stand pipe into said tank housing during backwash operation.

10. The tank assembly as defined in claim 9 wherein said adapter includes a plurality of flow tubes fluidly communicating with said valving means, water flowing from said valving means through said flow tubes into said tank housing during normal operation and flowing from said tank housing through said flow tubes and valving means during backwash operation.

11. The tank assembly as defined in claim 10 wherein said means for selectively venting gases from said tank housing includes a vent port formed in said adapter and a vent valve positioned within said port for selectively opening said port when accumulated gases attain a predetermined volume within said tank housing.

12. The tank assembly as defined in claim 11 wherein said vent valve is connected to a float member whereby said vent valve is opened when said float member reaches a predetermined level within said tank housing according to the volume of gases within said housing.

13. The tank assembly as defined in claim 12 wherein said float member is slidably mounted to said stand pipe.

14. The tank assembly as defined in claim 12 wherein said adapter includes a screen housing, said vent valve and float member positioned within said screen housing to prevent the filter media from engaging said venting means, said flow tubes and said stand pipe extend through said screen housing of said adapter into said tank housing.

15. In a filtration tank, an adapter to vent accumulated gases from the tank, the filtration tank including a filter media and means for controlling fluid flow through the tank during normal and backwash operations, the flow control means adapted to be normally received within a neck opening of the tank, the improvement comprising:

a flange body received within the neck opening of the tank, said flange body including means for receiving the flow control means;

vent means mounted to said flange body, said vent means including a vent port formed in said flange body and a vent valve positioned within said vent port, said vent valve selectively operable when the accumulated gases attain a predetermined volume within the tank; and at least one fluid passageway providing fluid communication between the flow control means and the interior of the tank;

said adapter venting accumulated gases from the tank through selectively operable vent means when the accumulated gases attain a predetermined volume and providing fluid communication between the flow control means and the tank interior during backwash and normal operating cycles.

16. The adapter as defined in claim 15 wherein said at least one fluid passageway includes a plurality of flow tubes providing fluid communication between the flow control means and the tank, said flow tubes having a fluid port within the tank.

17. The adapter as defined in claim 16 and further comprising a screen housing attached to said flange body, said screen housing enclosing said vent means to prevent the filter media from engaging said vent means, said plurality of flow tubes extending through said screen housing with said fluid port of said flow tubes positioned outside of said screen housing.

18. The adapter as defined in claim 17 wherein the flow control means includes a stand pipe extending into the filter media within the filter tank, the stand pipe extending through an axial passageway of said adapter.

19. The adapter as defined in claim 18 wherein said vent means includes a float member actuably connected to said vent valve such that as said float member attains a predetermined level within the tank according to the volume of gases accumulated within the tank said vent valve will be opened to vent the accumulated gases, said float member slidably mounted within said screen housing to the stand pipe extending through said adapter.

20. A system for removing contaminants from a water supply comprising:

means for entraining a controlled quantity of air into the water to oxidize the contaminants in the water;

a filtration tank having flow control means to control fluid flow through said tank, said control means including a fluid inlet to receive the water from said air entraining means and a fluid outlet to deliver filtered water to service; and an adapter received within a neck opening of said tank, said adapter receiving said flow control means, said adapter including means for selectively venting accumulated gases from said filtration tank;

said filtration tank having a filter bed for filtering contaminants from the water and means for backwashing said filter bed to dispose of accumulated contaminants, the water flowing through said flow control means into said tank, through said filter bed to remove contaminants from the water, and from said filtration tank through said fluid outlet of said control means; and said adapter including at least one fluid passageway in fluid communication with said flow control means of said filtration tank and means for receiving a stand pipe of said flow control means extending into said filter bed, fluid flowing through said at least one fluid passageway and said stand pipe in a first direction during normal operation of the system and flowing through said at least one fluid passageway and said stand pipe in a second direction during backwash of the system, said flow control means controlling fluid flow through said at least one fluid passageway and stand pipe.

21. The system as defined in claim 20 wherein said venting means includes a vent port formed in said adapter and valve means for selectively opening said vent port when the accumulated gases attain a predetermined volume within said tank.

22. The system as defined in claim 21 wherein said venting valve means comprises a valve actuably connected to a float member, said float member opening and closing said valve in accordance with the water level within said tank to vent accumulated gases from said filtration tank.

* * * * *